United States Patent
Ando

(10) Patent No.: US 10,850,703 B2
(45) Date of Patent: Dec. 1, 2020

(54) CONTROL DEVICE, COMPUTER READABLE RECORDING MEDIUM RECORDING PROGRAM FOR CONTROL DEVICE, AND CONTROL METHOD

(71) Applicant: TOYOTA JIDOSHA KABUSHIKI KAISHA, Toyota (JP)

(72) Inventor: Eisuke Ando, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/355,216

(22) Filed: Mar. 15, 2019

(65) Prior Publication Data

US 2019/0299927 A1 Oct. 3, 2019

(30) Foreign Application Priority Data

Mar. 30, 2018 (JP) .................. 2018-068835

(51) Int. Cl.
*B60R 25/04* (2013.01)
*B60K 28/12* (2006.01)
(Continued)

(52) U.S. Cl.
CPC .............. *B60R 25/04* (2013.01); *B60K 28/12* (2013.01); *B60R 25/00* (2013.01); *B60R 25/241* (2013.01); *H04L 9/3226* (2013.01); *H04L 9/3239* (2013.01); *B60K 2028/003* (2013.01); *H04L 2209/38* (2013.01); *H04L 2209/84* (2013.01)

(58) Field of Classification Search
CPC ....... B60R 25/00; B60R 25/04; B60R 25/241; H04L 9/3226; H04L 9/3239; H04L 67/12; H04L 63/08; B60K 28/12; H04W 12/06; H04W 4/40; G07C 5/008
See application file for complete search history.

(56) References Cited

U.S. PATENT DOCUMENTS

2005/0192716 A1  9/2005  Ito et al.
2011/0144844 A1* 6/2011  Ishibashi ............... G07F 15/005
                                                      701/22
(Continued)

FOREIGN PATENT DOCUMENTS

CN        107749845 A      3/2018
DE  10 2005 000 999 A1    8/2005
(Continued)

OTHER PUBLICATIONS

Bernardini, Cesar et al. "Security and privacy in vehicular communications: Challenges and opportunities". Vehicular communications, vol. 10, pp. 13-28, 2017.

*Primary Examiner* — Orlando Bousono
(74) *Attorney, Agent, or Firm* — Oliff PLC

(57) ABSTRACT

A control device includes a communication unit configured to acquire control information on a vehicle from an information processing device in a wired or wireless communication, and a processing unit configured to execute a process of starting vehicle control based on the control information. The processing unit continues or suspends the process of starting vehicle control depending on a result of an authentication process on usage authority of the control information, and the authentication process is executed while the process of starting vehicle control is executed.

18 Claims, 10 Drawing Sheets

(51) Int. Cl.
  *B60R 25/24* (2013.01)
  *H04L 9/32* (2006.01)
  *B60R 25/00* (2013.01)
  *B60K 28/00* (2006.01)

(56) References Cited

U.S. PATENT DOCUMENTS

| | | | |
|---|---|---|---|
| 2013/0005302 A1* | 1/2013 | Ozaki | H04L 63/0876 |
| | | | 455/411 |
| 2014/0114504 A1* | 4/2014 | Yamashita | B60R 25/40 |
| | | | 701/2 |
| 2016/0144857 A1 | 5/2016 | Ohshima | |
| 2016/0344747 A1* | 11/2016 | Link, II | H04L 67/12 |
| 2017/0011572 A1* | 1/2017 | Link, II | H04L 63/123 |
| 2017/0105120 A1* | 4/2017 | Kang | H04W 4/80 |
| 2017/0174180 A1* | 6/2017 | Hoyos | H05K 999/99 |
| 2017/0313320 A1 | 11/2017 | Asakura et al. | |
| 2018/0009417 A1* | 1/2018 | Hoyos | H05K 999/99 |
| 2018/0108194 A1* | 4/2018 | Link, II | G07C 9/00182 |
| 2019/0259229 A1* | 8/2019 | Link, II | G06F 21/34 |

FOREIGN PATENT DOCUMENTS

| | | |
|---|---|---|
| JP | 2016-099953 A | 5/2016 |
| JP | 2017-197066 A | 11/2017 |
| KR | 10-2015-0020738 A | 2/2015 |

* cited by examiner

FIG. 4

| PROVIDER IDENTIFICATION INFORMATION | USAGE AUTHORITY |
|---|---|
| 001 | API1, API2, API3, API4, API5 |
| 002 | API1, API2, API3, API4, API5, API6 |
| 003 | API1, API2, API3, API4 |
| ... | ... |

CONTROL DEVICE, COMPUTER READABLE RECORDING MEDIUM RECORDING PROGRAM FOR CONTROL DEVICE, AND CONTROL METHOD

INCORPORATION BY REFERENCE

The disclosure of Japanese Patent Application No. 2018-068835 filed on Mar. 30, 2018 including the specification, drawings and abstract is incorporated herein by reference in its entirety.

BACKGROUND

1. Technical Field

The disclosure relates to a control device, a computer readable recording medium recording a program for a control device, and a control method.

2. Description of Related Art

In recent years, service providers are concentrating on development and the like related to automatic driving techniques of vehicles. For example, Japanese Unexamined Patent Application Publication No. 2017-197066 (JP 2017-197066 A) discloses a technique for controlling automatic driving based on information unique to a vehicle occupant received from a server in order to perform automatic driving that is optimal for the vehicle occupant.

SUMMARY

When an interface for vehicle control is disclosed to a service provider so that vehicle control can be performed via the interface, it is conceivable to set usage authority according to control information on vehicle control. In this case, proper authority management is necessary.

The disclosure provides a control device, a computer readable recording medium recording a program for a control device, and a control method, which are capable of performing appropriate authority management in a case where usage authority is set in control information for a vehicle.

A control device according to a first aspect of the disclosure includes: a communication unit configured to acquire control information on a vehicle from an information processing device via a wired or wireless communication; and a processing unit configured to execute a process of starting vehicle control based on the control information, wherein the processing unit continues or suspends the process of starting vehicle control depending on a result of an authentication process on usage authority of the control information, and the authentication process is executed while the process of starting vehicle control is executed.

A computer readable recording medium according to a second aspect of the disclosure, stores a program that causes a computer operating as a control device to execute: acquiring control information on a vehicle from an information processing device via a wired or wireless communication; executing a process of starting vehicle control based on the control information; and continuing or suspending the process of starting vehicle control depending on a result of an authentication process on usage authority of the control information, wherein the authentication process is executed while the process of starting vehicle control is executed.

A control method according to a third aspect of the disclosure includes: acquiring control information on a vehicle from an information processing device via a wired or wireless communication; executing a process of starting vehicle control based on the control information; and continuing or suspending the process of starting vehicle control depending on a result of an authentication process on usage authority of the control information, wherein the authentication process is executed while the process of starting vehicle control is executed.

With the control device, the program for a control device, and the control method according to the aspects of the disclosure, it is possible to perform appropriate authority management in the case where usage authority is set in control information for a vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is a diagram showing an example of subscription information;

DETAILED DESCRIPTION OF EMBODIMENTS

Hereinafter, embodiments of the disclosure will be described.

Embodiment 1

Figure 1:
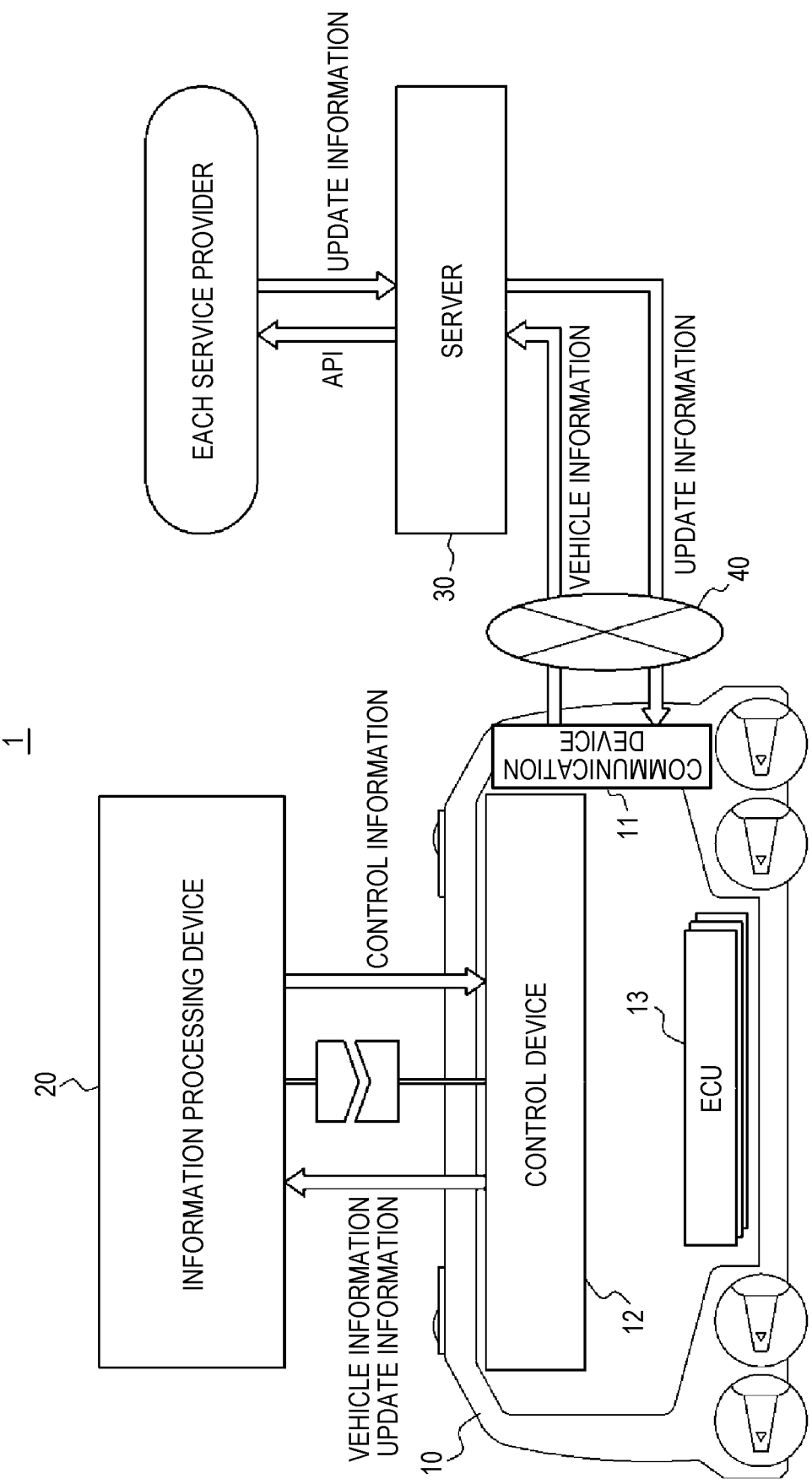
FIG. 1 is a diagram showing an overview of a vehicle control system according to a first embodiment.

An overview of a vehicle control system 1 according to one embodiment of the disclosure will be described with reference to FIG. 1. The vehicle control system 1 includes a vehicle 10, an information processing device 20, and a server 30. In FIG. 1, for the sake of simplicity of explanation, one vehicle 10 and one information processing device 20 are shown. However, the number of each of the vehicle 10 and the information processing device 20 provided in the vehicle control system 1 may be set arbitrarily. The vehicle 10, the information processing device 20, and the server 30 are connected to a network 40 such as the Internet or the like.

The vehicle 10 is, for example, a car. However, the vehicle 10 is not limited thereto and may be an arbitrary vehicle on which a person can board. The information processing device 20 is an automatic driving kit including, for example, a computer in which automatic driving control software is installed, a camera, a sensor and the like. However, the information processing device 20 is not limited thereto and may be an arbitrary device. The server 30 includes one or more server devices capable of making communication with each other. In the present embodiment, for the sake of simplicity of explanation, it is assumed that the server 30 is one server device.

In the vehicle control system 1 according to the present embodiment, the vehicle 10 and the information processing device 20 cooperate to execute the vehicle control of the vehicle 10. As an outline, the vehicle control system 1 includes a below-described control device 12 as an interface for the vehicle 10 to receive control information from the information processing device 20. The vehicle 10 that has acquired the control information executes a process of starting vehicle control based on the control information. At least a part of application programming interface (API) that specifies the specifications of such control information is disclosed to a service provider. This may promote technology development, creation of new mobility services, and the like, which are performed by the service provider. In this case, it is necessary to perform appropriate authority management such as allowing only a service provider having usage authority to use predetermined control information (for example, control information for controlling a part of expanded functions and the like). It is also necessary to prevent processing delay due to such management and to prevent falsification of information related to authority management, and the like.

In the present embodiment, the usage authority is set for each control information, and some control information can be used only by a service provider having usage authority. In other words, some APIs can be used only by service providers having usage authority of APIs. The vehicle control system 1 performs an authentication process on usage authority so that only a service provider having usage authority to use control information is allowed to perform vehicle control using the control information.

In this regard, the vehicle control system 1 executes the authentication process on the usage authority of the control information for the vehicle control while performing a process of starting vehicle control. That is to say, the process of starting vehicle control based on the control information and the authentication process on the usage authority of the control information are performed in parallel. The vehicle 10 continues or suspends the process of starting vehicle control according to the result of the authentication process on the usage authority. That is to say, the vehicle control system 1 executes the process of starting vehicle control based on the acquired control information, before obtaining the result of the authentication process on the usage authority of the control information. By executing the authentication process on usage authority in parallel with the process of starting vehicle control, delay in the process related to vehicle control can be prevented.

Next, each configuration of the vehicle control system 1 will be described in detail.

(Configuration of Vehicle)

As shown in FIG. 1, the vehicle 10 includes a communication device 11, the control device 12, and a plurality of electronic control units (ECUs) 13. The communication device 11, the control device 12, and the plurality of ECUs 13 are communicably connected with one another via an in-vehicle network such as a controller area network (CAN) or the like, or a dedicated line.

The communication device 11 may be an in-vehicle communication device such as a data communication module (DCM) or the like. In order to be connected to the network 40, the communication device 11 may include a communication module corresponding to a mobile communication standard such as 4th generation (4G), 5th generation (5G), or the like.

Figure 2:
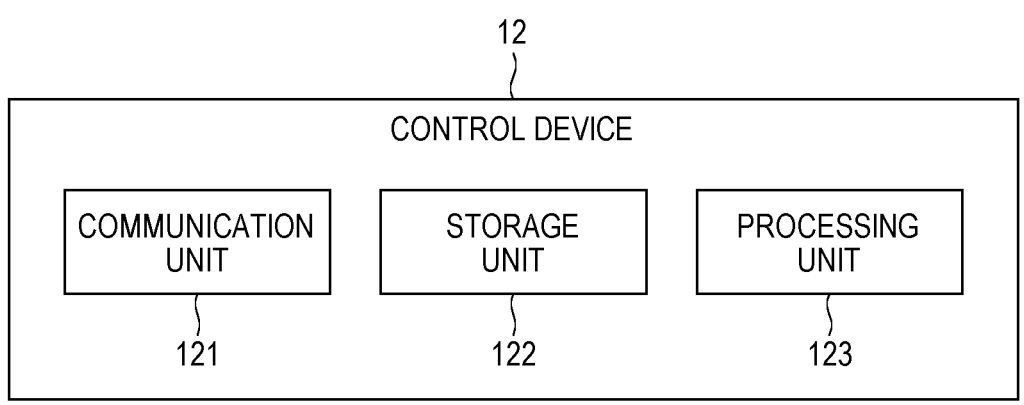
FIG. 2 is a block diagram showing a schematic configuration of a control device according to the first embodiment.

The control device 12 is a device that performs vehicle control based on the control information transmitted from the information processing device 20. The vehicle control is, for example, automatic driving to a destination, but is not limited thereto. The automatic driving includes, for example, levels 1 to 5 as defined by the Society of Automotive Engineers (SAE), but is not limited thereto. The automatic driving may be arbitrarily defined. Furthermore, the vehicle control is performed by cooperation between the control device 12 and the respective ECUs 13. As shown in FIG. 2, the control device 12 includes a communication unit 121, a storage unit 122, and a processing unit 123.

The communication unit 121 includes a communication module that makes communication with the information processing device 20, the communication device 11, and the respective ECUs 13. For example, the communication unit 121 may include a communication module corresponding to a predetermined communication standard. An arbitrary communication protocol can be employed when the communication unit 121 communicates with the information processing device 20. Moreover, the communication unit 121 and the information processing device 20 may communicate with each other by either wired communication or wireless communication. For example, hypertext transfer protocol (HTTP)-based representational state transfer (REST) may be adopted as a communication protocol between the communication unit 121 and the information processing device 20. Furthermore, for example, a CAN may be adopted as a communication protocol when the communication unit 121 communicates with the communication device 11 and the respective ECUs 13. When the communication protocol with the information processing device 20 differs from the communication protocol with the communication device 11 and the respective ECUs 13, the communication unit 121 performs data conversion so as to conform to the communication protocol with the communication destination.

The storage unit 122 includes one or more memories. In the present embodiment, the "memories" are, for example, semiconductor memories, magnetic memories, optical memories or the like, but are not limited thereto. Each of the memories included in the storage unit 122 may function as, for example, a main storage device, an auxiliary storage device, or a cache memory. The storage unit 122 stores arbitrary information used for the operation of the control device 12. For example, the storage unit 122 may store a system program, an application program, a database and the like. The information stored in the storage unit 122 may be updatable with, for example, information acquired from the network 40 via the communication device 11.

The processing unit 123 includes one or more processors. In the present embodiment, the "processors" are general-purpose processors or dedicated processors specialized for specific processes, but are not limited thereto. The processing unit 123 controls the overall operation of the control device 12.

For example, the processing unit 123 receives various kinds of vehicle information (speed, position, automatic driving state, etc.) related to the vehicle 10 from the ECUs 13 and the like via the communication unit 121. Furthermore, the processing unit 123 transmits the vehicle information to the information processing device 20 via the communication unit 121. In addition, the processing unit 123 transmits the vehicle information to the communication device 11 via the communication unit 121. The vehicle information is transmitted to the server 30 by the communication device 11. Moreover, the processing unit 123 receives below-described update information from the communication device 11 via the communication unit 121. The update information is provided from the server 30. The processing unit 123 transmits the update information to the information processing device 20 via the communication unit 121.

Upon acquiring the control information from the information processing device 20 via the communication unit 121, the processing unit 123 executes a process of starting vehicle control on the vehicle 10 based on the control information. As described above, the processing unit 123 executes the process of starting vehicle control based on the control information without waiting for the result of the authentication process on the usage authority of the control information.

Furthermore, the processing unit 123 performs an authentication process on the usage authority of the control information. When the processing unit 123 includes a plurality of processor cores, the process of starting vehicle control may be executed by a certain processor core, and the authentication process may be executed by another processor core different from the processor core that executes the process of starting vehicle control. The authentication process on the usage authority is performed based on the information on the service provider (service provider identification information) related to the control information and the API to be used. The control information includes the service provider identification information and information on the API to be used. The authentication process on usage authority is executed based on such information included in the control information.

Figure 3:
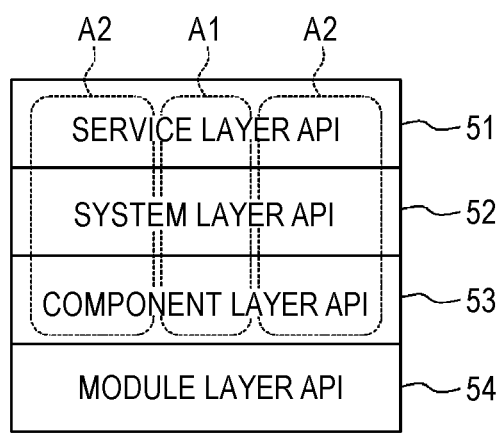
FIG. 3 is a diagram showing a structure of an application programming interface (API)

A plurality of APIs related to the control information is set according to the scope, function and the like of a controlled object. FIG. 3 is a conceptual diagram showing the structure of a plurality of APIs. The structure of the APIs illustrated in FIG. 3 is a hierarchical structure in which a plurality of APIs is classified into respective layers according to the scope of the controlled object. In FIG. 3, the structure is composed of four hierarchies of API layers 51 to 54 sequentially from the higher hierarchy. As an outline, the service provider uses APIs of a high hierarchy, which allows the service provider to perform vehicle control without becoming aware of control contents of hierarchies lower than the high hierarchy.

The API layer 51 is called a service layer API and is a hierarchy in which how the entire vehicle 10 is operated is packaged. For example, an API that provides an automatic driving service to a designated point is included in the API layer 51. The API layer 52 is called a system layer API and is a hierarchy that provides individual manipulations of systems (motors, steers, maps, etc.) constituting the vehicle 10. For example, an API for instructing the motor of the vehicle 10 to move forward is included in the API layer 52. When using the API that instructs forward movement, the vehicle speed may be determined by the vehicle 10, or may be selected from a low speed, a medium speed, and a high speed. The API layer 53 is called a component layer API and is a hierarchy that provides individual manipulations of components (acceleration/deceleration controller, stereo, etc.) constituting the system. For example, an API for driving a motor by specifying forward acceleration is included in the API layer 53. The API layer 54 is called a module layer API and is a hierarchy that provides individual manipulations of modules (for example, a torque map, etc.) that are detailed functions constituting the components. For example, an API for instructing a driving method (acceleration feeling, etc.) by designating a constant value of a torque map is included in the API layer 54.

Among the API layers 51 to 53, APIs in a disclosure range A1 shown in FIG. 3 are disclosed to a service provider as a basic package at no cost. That is to say, all service providers have usage authority of the APIs in the disclosure range A1. When the control device 12 acquires control information related to an API in the disclosure range A1, all service providers have usage authority. Therefore, it is not necessary to perform an authentication process on usage authority.

Among the API layers 51 to 53, APIs in a disclosure range A2 in FIG. 3 are disclosed to a service provider as expanded function APIs at a cost. For example, the disclosure range A2 is provided to the service provider with a fee that is charged according to a disclosed range. Therefore, the APIs in the disclosure range A2 are different in usability for each service provider. The API layer 54 is not disclosed in principle.

FIG. 4 shows an example of subscription information for determining the usage authority of each service provider. The subscription information includes data in which service provider identification information and usage authority are associated with all service providers having usage authority. For example, the subscription information is received from the server 30 via the communication device 11 and is stored in the storage unit 122. In this regard, the service provider identification information is identification information uniquely defining the service provider. The usage authority indicates expanded function APIs of which the service provider has usage authority. In this regard, it is assumed that all of API1 to API6 are expanded function APIs.

As shown in FIG. 4, for example, a service provider having service provider identification information of "001" has usage authority of API1 to API5. Based on such information, the processing unit 123 can perform an authentication process on the usage authority of each service provider. For example, in a case where an authentication process is performed with respect to the control information related to API5 including "001" as the service provider identification information, the result of the authentication process is "valid". However, for example, in a case where an authentication process is performed with respect to the control information related to API6 including "001" as the service provider identification information, the authentication result is "invalid" because such control information has no usage authority of the API.

The processing unit 123 continues or suspends a process of starting vehicle control depending on the result of the authentication process. For example, when the authentication result is "valid", the processing unit 123 continues the process of starting vehicle control. On the other hand, when the authentication result is "invalid", the processing unit 123 suspends the process of starting vehicle control. In this regard, the process of starting vehicle control includes a process of generating a control command (for example, a command related to a run, turn, and stop of the vehicle 10) based on the control information and a process of transmitting the generated control command to the ECUs 13 via the communication unit 121. When continuing the process of starting vehicle control, the control command generation and transmission processes are continuously performed.

Therefore, the control of the vehicle 10 is executed according to the control command. On the other hand, when suspending the process of starting vehicle control, the control command generation and transmission processes are suspended. In this case, the control command is not transmitted to the ECUs 13. Therefore, the control of the vehicle 10 according to the control command is not executed. When the process of starting vehicle control is suspended, the processing unit 123 may transmit information, which indicates that the process of starting vehicle control has been suspended, to the information processing device 20 via the communication unit 121.

The ECUs 13 perform vehicle control in cooperation with the control device 12. Specifically, the ECUs 13 receive a control command based on the control information from the control device 12 and control the vehicle 10 according to the control command. The control command includes, for example, an acceleration, deceleration, and braking of the vehicle 10, steering operation, a stereo operation, an air conditioning operation, a security alarm, and the like. The ECUs 13 perform such control with respect to power sources, in-vehicle devices and the like based on the control command. In addition, the ECUs 13 collect the vehicle information on the vehicle 10 and transmit the vehicle information to the control device 12.

(Configuration of Information Processing Device)

Figure 5:
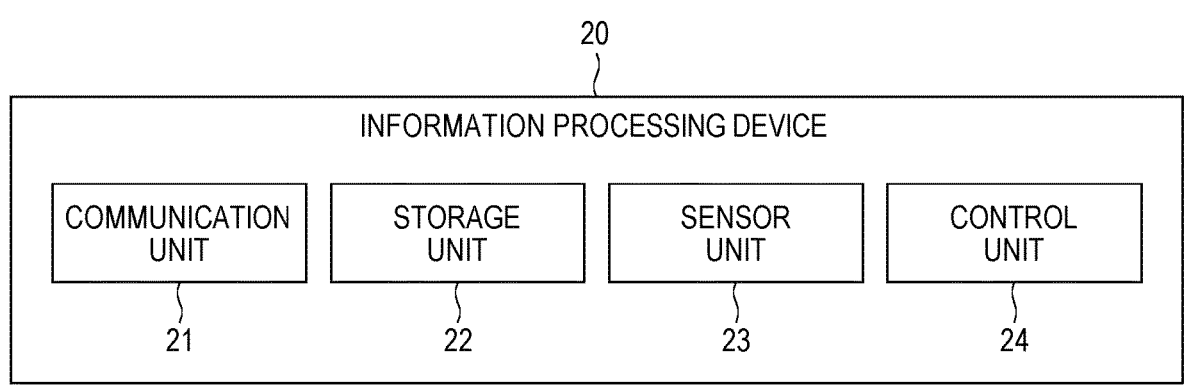
FIG. 5 is a block diagram showing a schematic configuration of an information processing device according to the first embodiment.

As shown in FIG. 5, the information processing device 20 includes a communication unit 21, a storage unit 22, a sensor unit 23, and a control unit 24. The information processing device 20 is mounted on, for example, a roof top of the vehicle 10. The location at which the information processing device 20 is mounted is not limited thereto. The information processing device 20 may be mounted at any arbitrary place outside the vehicle 10 or in the passenger compartment.

The communication unit 21 includes a communication module connected to the control device 12 of the vehicle 10. For example, the communication unit 21 is connected to the control device 12 via a wired network or a wireless network.

The storage unit 22 includes one or more memories. Each of the memories included in the storage unit 22 may function as, for example, a main storage device, an auxiliary storage device, or a cache memory. The storage unit 22 stores arbitrary information used for the operation of the information processing device 20. For example, the storage unit 22 stores a system program, an application program, service provider identification information and the like. The application program includes the automatic driving control software described above. In this case, the information processing device 20 functions as an automatic operation kit by the automatic driving control software. The information stored in the storage unit 22 may be updateable with, for example, the update information acquired from the control device 12 via the communication unit 21.

The sensor unit 23 includes one or more sensors that detect information on the operation of the information processing device 20 or the surrounding environment. For example, the sensor unit 23 may include a light detection and ranging (LIDAR), an acceleration sensor, an angular velocity sensor, a magnetic sensor, an atmospheric pressure sensor and the like. The sensor unit 23 is not limited thereto and may include an arbitrary sensor, for example, an illuminance sensor, a temperature sensor, or an image sensor (camera). The sensor unit 23 acquires information detected by each sensor as sensor information. For example, the sensor information of the sensor unit 23 may include LIDAR detection information, an acceleration, an angular velocity, a magnetic field, an atmospheric pressure and the like.

The control unit 24 includes one or more processors. The control unit 24 controls the overall operation of the information processing device 20.

For example, the control unit 24 accumulates the sensor information acquired by the sensor unit 23 in the storage unit 22. Furthermore, the control unit 24 receives vehicle information and update information from the control device 12 via the communication unit 21. Moreover, the control unit 24 generates control information based on the sensor information, the vehicle information and the like, and transmits the control information to the control device 12 via the communication unit 21. When the service provider identification information is stored in the storage unit 22, the control unit 24 may generate control information using the stored service provider identification information.

(Configuration of Server)

Figure 6:
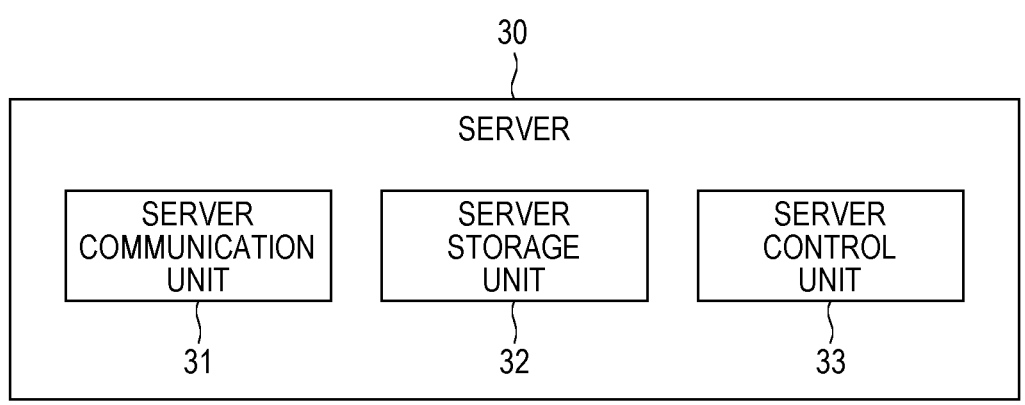
FIG. 6 is a block diagram showing a schematic configuration of a server according to the first embodiment.

As shown in FIG. 6, the server 30 includes a server communication unit 31, a server storage unit 32, and a server control unit 33.

The server communication unit 31 includes a communication module connected to the network 40. For example, the server communication unit 31 may include a communication module corresponding to a predetermined wired standard or wireless standard. In the present embodiment, the server 30 is connected to the network 40 via the server communication unit 31.

The server storage unit 32 includes one or more memories. Each of the memories included in the server storage unit 32 may function as, for example, a main storage device, an auxiliary storage device, or a cache memory. The server storage unit 32 stores arbitrary information used for the operation of the server 30. For example, the server storage unit 32 may store a system program, an application program, a management database and the like. The information stored in the server storage unit 32 may be updateable with, for example, the information acquired from the network 40 via the server communication unit 31.

The server control unit 33 shown in FIG. 6 includes one or more processors. The server control unit 33 controls the overall operation of the server 30.

For example, the server control unit 33 receives vehicle information from the vehicle 10 via the server communication unit 31. The server control unit 33 may accumulate the vehicle information in the server storage unit 32. Based on the accumulated information, the server control unit 33 may provide a service provider with information necessary for various finances such as leasing, insurance and the like related to the vehicle 10, vehicle maintenance in cooperation with dealers, and the like. Furthermore, based on the accumulated information, the server control unit 33 may disclose an API capable of managing information, such as status and dynamic management of the vehicle 10, required by a service provider. The service provider can easily obtain necessary information via the API.

The server control unit 33 may manage the subscription information. For example, the server control unit 33 may execute a process related to application for use, updating, termination and the like of the API from the service provider and create and update the subscription information. In addition, the server control unit 33 may transmit such subscription information to the vehicle 10 via the server communication unit 31.

The server control unit 33 may transmit the update information of the system program, the application program and the like of the information processing device 20 to the vehicle 10 via the server communication unit 31. The vehicle 10 receives the update information by the communication device 11 and transmits the update information to the information processing device 20 via the control device 12. In other words, the service provider related to the information processing device 20 can provide the update information on the information processing device 20 by over-the-air (OTA) using the server 30. Thus, it is possible to easily perform maintenance, updating and the like of the information processing device 20.

(Operation Flow of Information Processing System)

Figure 7:
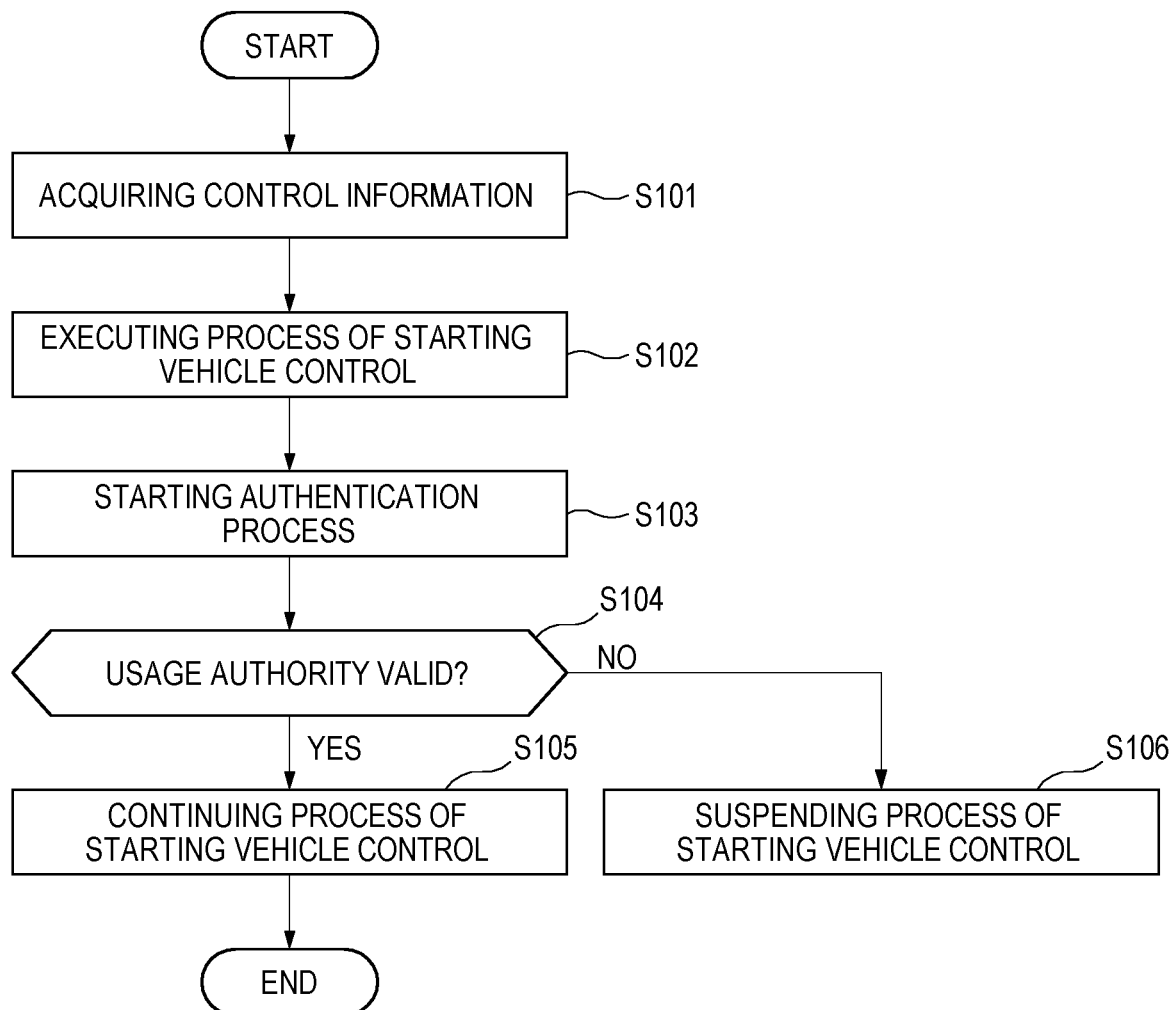
FIG. 7 is a flowchart showing an operation of the vehicle control system according to the first embodiment.

A flow of operations of the vehicle control system 1 will be described with reference to FIG. 7. Each time when the vehicle control system 1 acquires control information from the information processing device 20, the vehicle control system 1 executes following steps S101 to S106.

Step S101: The information processing device 20 transmits control information to the vehicle 10. The control device 12 of the vehicle 10 acquires the control information transmitted from the information processing device 20.

Step S102: The control device 12 of the vehicle 10 executes a process of starting vehicle control on the vehicle 10 based on the control information.

Step S103: While performing the process of starting vehicle control, the control device 12 of the vehicle 10 starts and executes an authentication process on the usage authority of the control information.

Step S104: When the control device 12 determines, as a result of the authentication process, that the usage authority of the control information is valid (if "YES" in step S104), the process proceeds to step S105. On the other hand, when the control device 12 determines, as a result of the authentication process, that the usage authority of the control information is not valid (if "NO" in step S104), the process proceeds to step S106.

Step S105: The control device 12 continues the process of starting vehicle control. That is to say, the process of starting vehicle control is executed until the process of starting vehicle control comes to an end, and the control device 12 transmits a control command to the ECUs 13.

Step S106: The control device 12 suspends the process of starting vehicle control. That is to say, the process of starting vehicle control is suspended before the process of starting vehicle control comes to an end, and the control device 12 does not generate a control command. Even when a control command is generated, the control device 12 does not transmit the generated control command to the ECUs 13.

As described above, with embodiment 1, when the usage authority is set for the control information of the vehicle 10, the control device 12 of the vehicle 10 continues or suspends the process of starting vehicle control depending on the result of the authentication process on the usage authority. Therefore, it is possible to perform appropriate authority management. Furthermore, upon acquiring the control information from the information processing device 20, the control device 12 executes the process of starting vehicle control based on the control information. The authentication process is executed while the process of starting vehicle control is executed, and the control device 12 continues or suspends the process of starting vehicle control depending on the result of the authentication process. As described above, with the vehicle control system 1 of the present embodiment, the process of starting vehicle control is executed without waiting for the result of the authentication process after acquiring the control information from the information processing device 20. This makes it possible to properly prevent delay in vehicle control.

Embodiment 2

Figure 8:
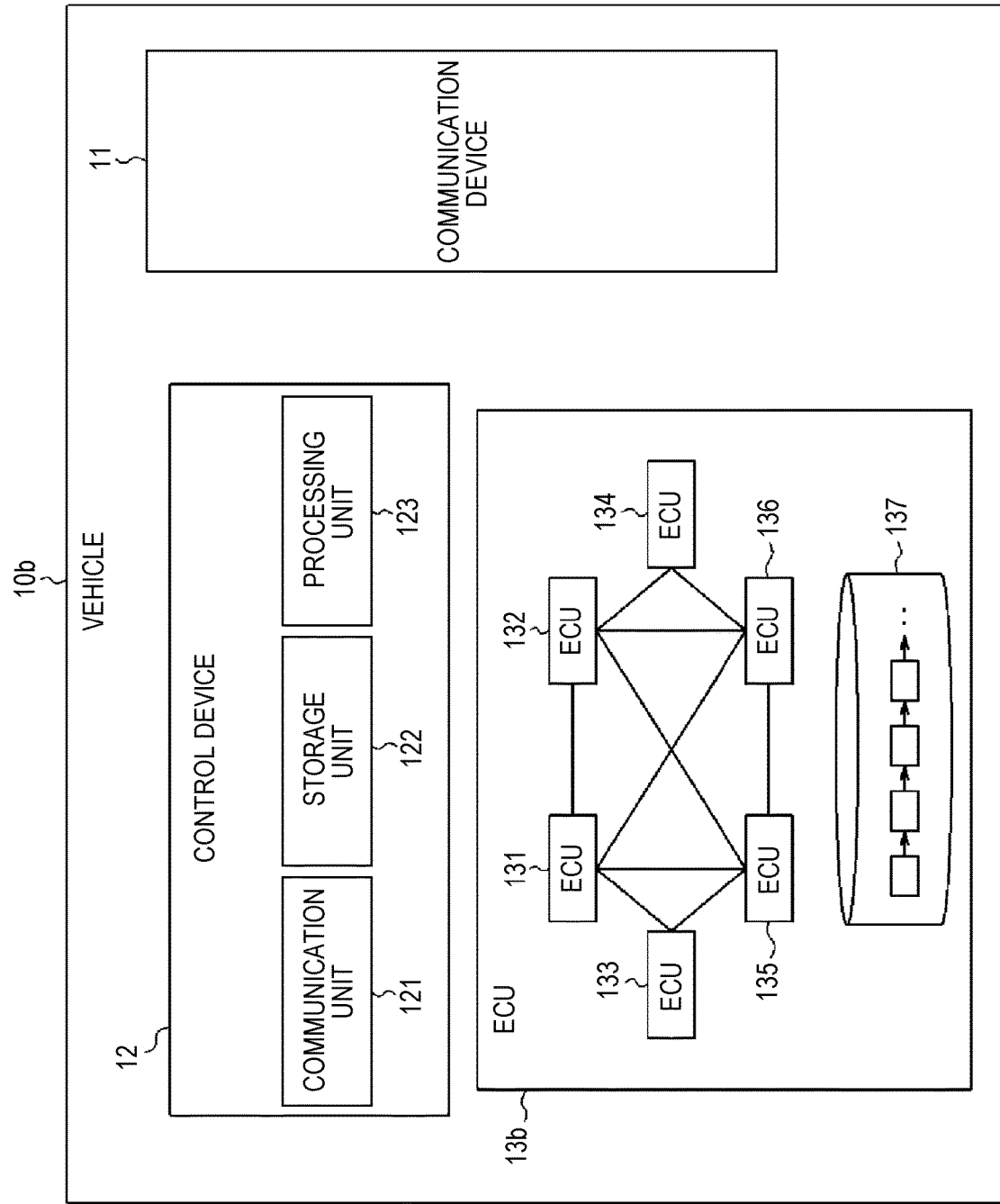
FIG. 8 is a block diagram showing a schematic configuration of a vehicle according to a second embodiment.

Next, embodiment 2 will be described. FIG. 8 is a block diagram showing a schematic configuration of a vehicle 10b according to embodiment 2 of the present disclosure. The same configurations as those of embodiment 1 are designated by like reference numerals, and the explanation thereof is omitted. In the vehicle 10b according to embodiment 2, the subscription information necessary for the authentication process on the usage authority is configured by a block chain 137 managed by each of ECUs 131 to 136 (hereinafter, also collectively referred to as ECUs 13b). That is to say, the ECUs 131 to 136 are connected by a peer-to-peer (P2P) architecture, and each of the ECUs 131 to 136 has the block chain 137 and functions as a node for managing the block chain 137. The ECUs 131 to 136 execute an authentication process on usage authority using the block chain 137. Although six ECUs 13b are shown in FIG. 8 for the sake of simplicity of explanation, the number of ECUs may be arbitrarily set. Hereinafter, a flow of operations of the vehicle control system 1 according to embodiment 2 will be described with reference to FIGS. 9 and 10.

Step S201: The information processing device 20 transmits control information to the vehicle 10b. The control device 12 of the vehicle 10b acquires the control information transmitted from the information processing device 20. This step corresponds to step S101 of embodiment 1.

Step S202: The control device 12 of the vehicle 10b executes a process of starting vehicle control on the vehicle 10b based on the control information. This step corresponds to step S102 of embodiment 1.

Step S203: The control device 12 requests the ECUs 13b to perform an authentication process on usage authority of the control information.

Step S204: The ECUs 13b that have received the request for authentication process starts the authentication process.

Step S205: The ECUs 13b execute the authentication process based on the subscription information constituted by the block chain 137, and terminates the authentication process.

Figure 9:
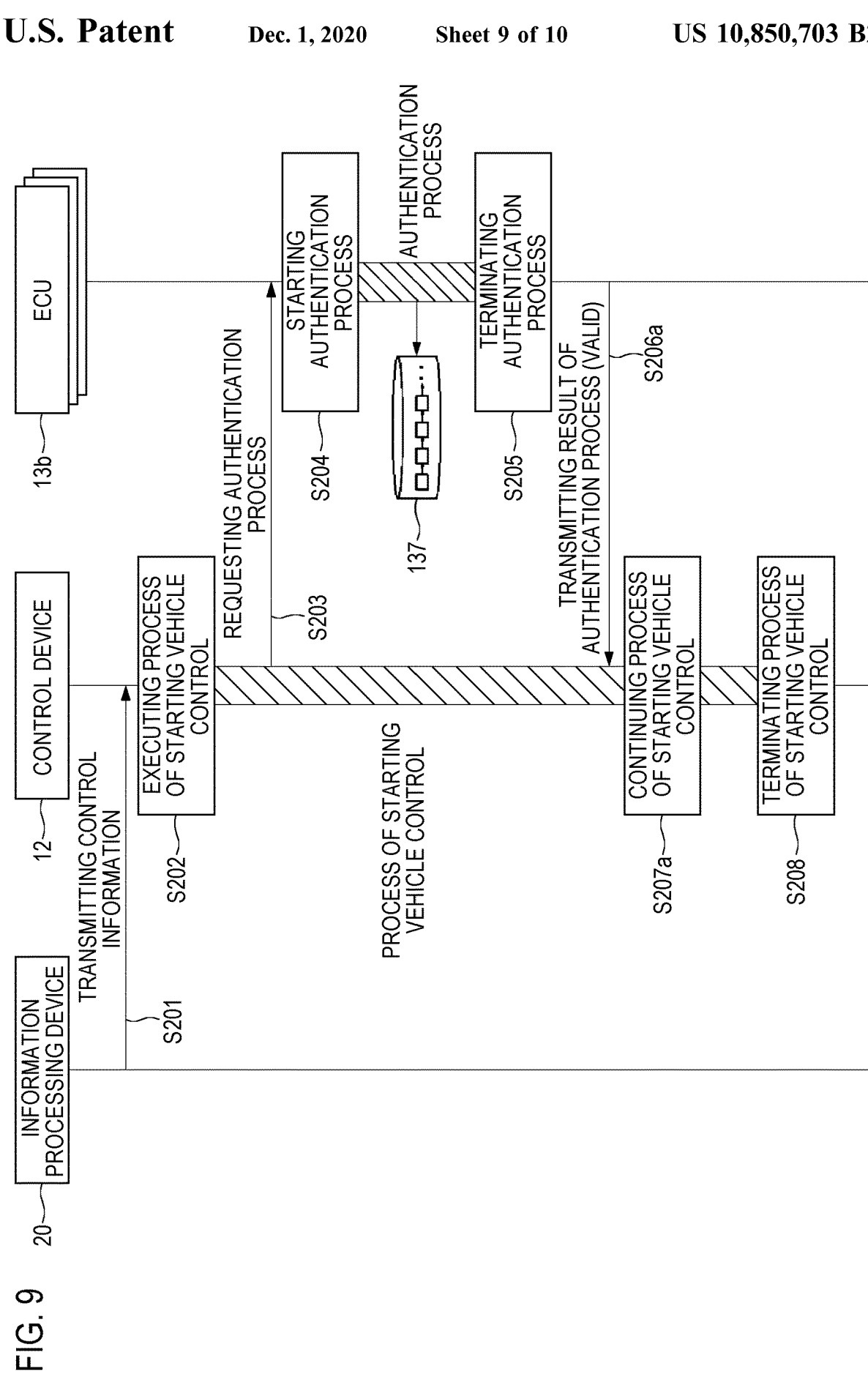
FIG. 9 is a sequence diagram showing an operation of a vehicle control system according to the second embodiment.

Step S206a: The ECUs 13b transmit the result of the authentication process to the control device 12. FIG. 9 shows a case where the result of the authentication process is valid.

Step S207a: The control device 12 receives the result of the authentication process. Since the authentication result is valid here, the control device 12 continues the process of starting vehicle control.

Step S208: The control device 12 terminates the process of starting vehicle control. That is to say, the control device 12 transmits the generated control command to the ECUs 13b.

Figure 10:
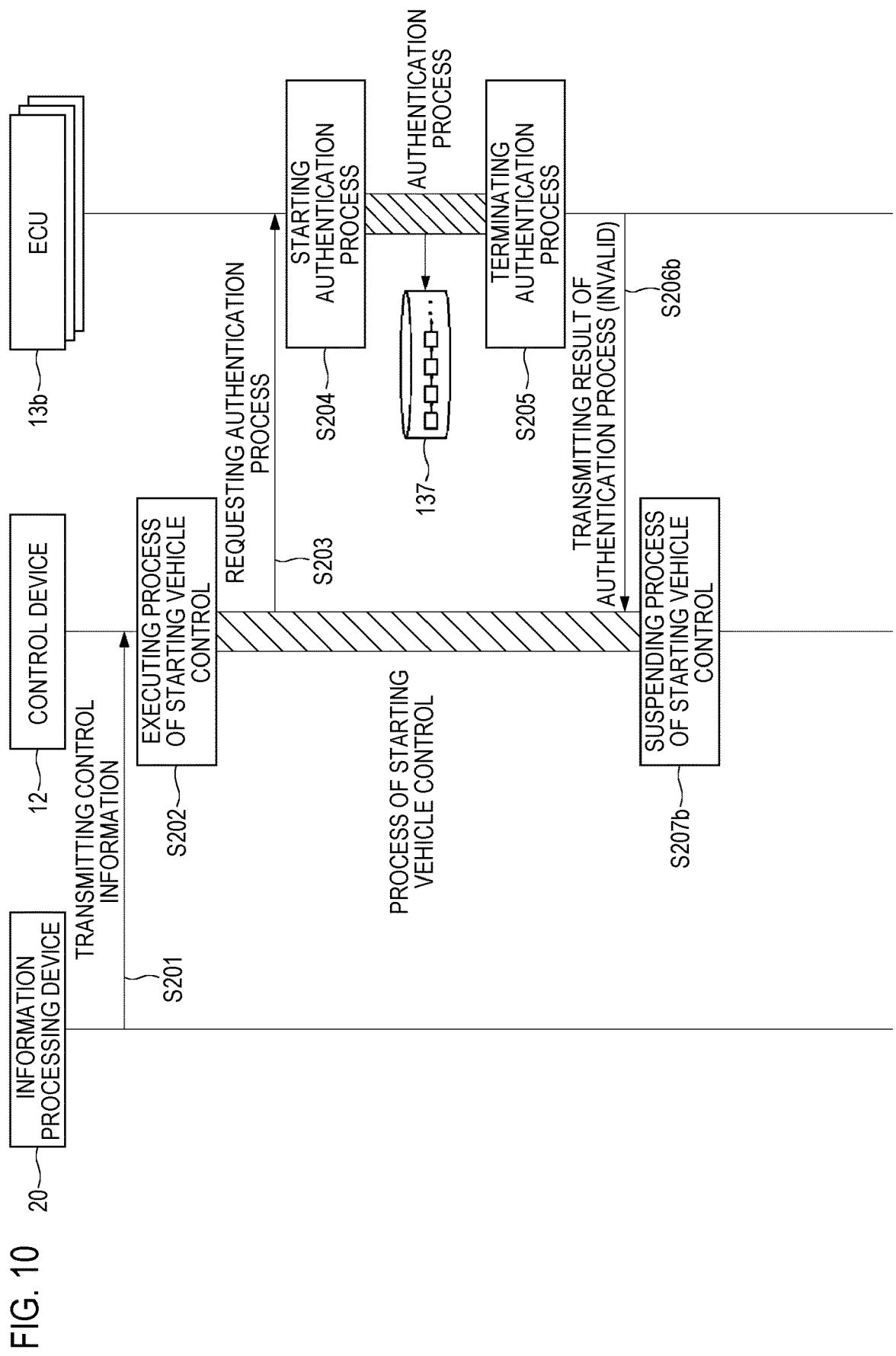
FIG. 10 is a sequence diagram showing an operation of the vehicle control system according to the second embodiment.

FIG. 10 shows a flow of operations in the case where the authentication result is invalid. The same operations as those shown in FIG. 9 are designated by like reference numerals, and the explanation thereof is omitted. In FIG. 10, the authentication result is invalid and the result is transmitted to the control device 12 (step S206b). In this case, the control device 12 suspends the process of starting vehicle control (step S207b).

As described above, with embodiment 2, when the usage authority is set in the control information of the vehicle 10b, the control device 12 of the vehicle 10b continues or suspends the process of starting vehicle control depending on the result of the authentication process on the usage authority. This makes it possible to perform proper authority management. In addition, the subscription information necessary for the authentication process on the usage authority is constituted by the block chain 137. For this reason, falsification of the subscription information is very difficult, and reliability of the authority management can be enhanced. Furthermore, each of the ECUs 13b has the subscription information constituted by the block chain 137. Therefore, even if the subscription information possessed by one of the ECUs 13b is damaged, it is possible to restore the damaged subscription information based on the subscription information possessed by other ECUs 13b. This makes it possible to enhance usability of the system. Furthermore, by utilizing each of the ECUs 13b of the vehicle 10 b as a node of the block chain 137, it is not necessary to use another computer or the like for managing the block chain 137. This makes it possible to reduce the cost for system construction.

While the disclosure has been described with reference to the drawings and examples, it should be noted that those skilled in the art can easily make various changes and modifications based on the present disclosure. It is therefore to be noted that these changes and modifications fall within the scope of the disclosure. For example, the functions and the like included in the respective means or the respective steps may be relocated so as not to be logically contradictory, and a plurality of means or steps may be combined into one or may be divided.

For example, the above-described embodiments have been described with an example where, by utilizing the fact that the process of starting vehicle control is higher in processing load and longer in processing time than the authentication process on usage authority, the authentication process on usage authority is executed after the process of starting vehicle control has been executed by the control device 12. Even in such a case, it is likely that the authentication result can be obtained before the process of starting vehicle control is terminated. This makes it possible to prevent delay in processing. When the authentication process on usage authority is executed simultaneously with the execution of the process of starting vehicle control by the control device 12, it is possible to further increase the possibility of obtaining the authentication result before the end of the process of starting vehicle control. Also, the authentication process on usage authority may be executed before the execution of the process of starting vehicle control by the control device 12. In any of the above cases, by executing the process of starting vehicle control and the authentication process in parallel, it is possible to prevent delay in processing as compared with a case where the process of starting vehicle control is executed after obtaining the authentication result. If the authentication result is not obtained at the end of the process of starting vehicle control, the control device 12 does not transmit a control command based on the process of starting vehicle control until the authentication result is obtained. That is to say, the control device 12 waits until the authentication result is obtained, and determines whether or not to transmit a control command depending on the result of the authentication process. By doing so, it is possible to perform proper authority management.

For example, in the above-described embodiments, each time when the control information is acquired, the authentication process on usage authority is executed and the vehicle control is continued or suspended depending on the result of the authentication process. However, the frequency of the authentication process may be changed as appropriate. For example, when the authentication process has been performed once for each piece of control information, the authentication process may not be performed again for the control information within a trip on which the authentication process has been performed. That is to say, when the authentication process has been performed once within a time period from turning ignition of a vehicle on to turning the ignition off, the authentication process may not be performed again within that time period. In such a case, it is possible to reduce the processing load due to the authentication process.

The above-described embodiments have been described with an example where the APIs related to the control information are constituted by the four hierarchies of the API layers 51 to 54. However, the number of hierarchies is not limited to four and may be larger or fewer than four. Moreover, the classification of the APIs into the hierarchies is not limited to the above-described embodiments and may be arbitrarily set. Furthermore, the structure of the APIs need not be a hierarchical structure, but may be any other arbitrary structure. The above-described embodiments have been described with an example where the disclosure range A1 shown in FIG. 3 is disclosed at no cost. However, the disclosure range A1 may also be disclosed at a cost. In addition, the above-described embodiments have been described with an example where the usage authority of the APIs is given based on the fee charged for the service provider. However, the method of setting usage authority is not limited thereto. The usage authority may be given to each service provider based on arbitrary conditions.

The above-described embodiments have been described with an example in which the storage unit 122 stores the subscription information of all the service providers having usage authority on control information. However, the disclosure is not limited thereto. For example, among all the service providers having usage authority on control information, only the subscription information of the service providers who are likely to use the control information for the vehicle 10 may be stored in the storage unit 122. The service providers who are likely to use the control information for the vehicle 10 may be specified by transmitting service provider identification information from the information processing device 20 to the control device 12 when the information processing device 20 is connected to the vehicle 10 for the first time.

For example, in embodiment 1, the authentication process on usage authority is executed by the control device 12. However, the disclosure is not limited thereto. In embodiment 1, the ECUs 13 may execute the authentication process during the execution of the process of starting vehicle control, and the control device 12 that receives the authentication result may continue or suspend the process of starting vehicle control. Even in this case, it is possible to perform proper authority management, inasmuch as the process of starting vehicle control is continued or suspended depending on the authentication result. In addition, since the process of starting vehicle control is executed without waiting for the result of the authentication process after acquiring the control information from the information processing device 20, it is possible to appropriately prevent delay in vehicle control. The authentication process may be requested to the server 30 or the like, instead of the ECUs 13. In such a case, the processing unit 123 may transmit a request for authentication process to the server 30 via the communication device 11 and may receive the result of the authentication process from the server 30. When the authentication process on the usage authority is performed by the ECUs 13 or the server 30 as described above, the ECUs 13 or the server 30 may have the subscription information.

Embodiment 2 has been described with an example where the ECUs 13b of the vehicle 10b are used as nodes that manage the block chain 137. However, the control device 12 may be used as a node that manages the block chain 137. ECUs of other surrounding vehicles may be used as nodes that manage the block chain 137. In this case, the vehicle 10b may be connected to other surrounding vehicles through vehicle-to-vehicle communication. Also, the server 30 may be used as a node that manages the block chain 137. That is to say, an arbitrary computer may function as a node that manages the block chain 137.

For example, a general-purpose electronic device may be configured to function as the control device 12 according to the above-described embodiments. Specifically, a program describing process contents for realizing each function of the control device 12 according to the embodiments is stored in a memory of an electronic device. The program is read out and executed by a processor of the electronic device. Therefore, the disclosure according to the embodiments can also be realized as a program executable by a processor, and a computer readable recording medium recording the program.

In addition to the examples described above, the network 40 according to the embodiments may include an ad hoc network, a local area network (LAN), a metropolitan area network (MAN), a cellular network, a wireless personal area network (WPAN), a public switched telephone network (PSTN), a terrestrial wireless network, an optical network, other networks, or any combination thereof. Components of a wireless network include, for example, an access point (e.g., Wi-Fi access point), a femtocell and the like. In addition, a wireless communication device may be connected to a wireless network using Wi-Fi (registered trademark), Bluetooth (registered trademark), cellular communication technology, or other wireless technology and technical standards.

What is claimed is:

1. A control device for use with a vehicle having a plurality of Electronic Control Units (ECUs), the control device comprising:
a communication unit configured to acquire control information on the vehicle from an information processing device via a wired or wireless communication; and
a processing unit configured to:
execute a process of starting vehicle control based on the control information,
after the process of starting vehicle control has been initiated, execute an authentication process on usage authority of the control information concurrently while the process of starting vehicle control is being executed, the authentication process being executed based on subscription information of all service providers having the usage authority of the control information, and
continue or suspend the process of starting vehicle control depending on a result of the authentication process on the usage authority of the control information wherein:
the subscription information of all service providers is constituted in a block chain, and
one or more ECU in the plurality of ECUs function as a node that manages the block chain.

2. The control device according to claim 1, wherein each time when the processing unit acquires the control information, the processing unit continues or suspends the process of starting vehicle control depending on the result of the authentication process.

3. The control device according to claim 1, wherein the authentication process is executed by at least one electronic control unit in the plurality of ECUs.

4. The control device according to claim 1, wherein the authentication process is executed based on subscription information of service providers that use the control information for the vehicle, among all service providers having the usage authority of the control information.

5. The control device according to claim 1, wherein when the process of starting vehicle control is suspended, a control command generation process and a vehicle transmission process are suspended.

6. The control device according to claim 1, wherein the ECUs are connected by a peer-to-peer (P2P) architecture formed by the block chain.

7. A non-transitory computer readable recording medium recording a program that causes a computer serving as a control device for use with a vehicle having a plurality of Electronic Control Units (ECUs), the program causing the computer to perform steps comprising:
acquiring control information on a vehicle from an information processing device via a wired or wireless communication;
executing a process of starting vehicle control based on the control information;
after the process of starting vehicle control has been initiated, executing an authentication process on usage authority of the control information concurrently while the process of starting vehicle control is being executed, the authentication process being executed based on subscription information of all service providers having the usage authority of the control information; and
continuing or suspending the process of starting vehicle control depending on a result of the authentication process on the usage authority of the control information, wherein:
the subscription information of all service providers is constituted in a block chain, and
one or more ECU in the plurality of ECUs function as a node that manages the block chain.

8. The non-transitory computer readable recording medium according to claim 7, wherein when the process of starting vehicle control is suspended, a control command generation process and a vehicle transmission process are suspended.

9. The non-transitory computer readable recording medium according to claim 7, wherein the ECUs are connected by a peer-to-peer (P2P) architecture formed by the block chain.

10. A control method for use with a vehicle having a plurality of Electronic Control Units (ECUs), the control method comprising:
acquiring control information on the vehicle from an information processing device in a wired or wireless communication;
executing a process of starting vehicle control based on the control information;
after the process of starting vehicle control has been initiated, executing an authentication process on usage authority of the control information concurrently while the process of starting vehicle control is being executed, the authentication process being executed based on subscription information of all service providers having the usage authority of the control information; and
continuing or suspending the process of starting vehicle control depending on a result of the authentication process on the usage authority of the control information, wherein:
the subscription information of all service providers is constituted in a block chain, and one or more ECU in the plurality of ECUs function as a node that manages the block chain.

11. The control method according to claim 10, wherein when the process of starting vehicle control is suspended, a control command generation process and a vehicle transmission process are suspended.

12. The control method according to claim 10, wherein the ECUs are connected by a peer-to-peer (P2P) architecture formed by the block chain.

13. A control device for use with a vehicle having a plurality of Electronic Control Units (ECUs), the control device comprising:
- a network interface configured to acquire control information on the vehicle from an information processing device via a wired or wireless communication; and
- at least one electronic control unit in the plurality of ECUs programmed to:
  - execute a process of starting vehicle control based on the acquired control information,
  - after the process of starting vehicle control has been initiated, execute an authentication process on an usage authority of the control information concurrently while the process of starting vehicle control is being executed, the authentication process being executed based on subscription information of all service providers having the usage authority of the control information,
  - determine a result of the authentication process on the usage authority of the control information, and
  - continue or suspend the process of starting vehicle control based on the determined result of the authentication process on the usage authority of the control information, wherein:
    the subscription information of all service providers is constituted in a block chain, and
    one or more ECU in the plurality of ECUs function as a node that manages the block chain.

14. The control device according to claim 13, wherein each time the control information is acquired by the at least one electronic control unit, the at least one electronic control unit continues or suspends the process of starting vehicle control depending on the result of the authentication process.

15. The control device according to claim 13, wherein
the at least one electronic control unit is mounted in the vehicle, and
the at least one electronic control unit executes the authentication process.

16. The control device according to claim 13, wherein the authentication process is executed based on subscription information of service providers that use the control information for the vehicle, among all service providers having the usage authority of the control information.

17. The control device according to claim 13, wherein when the process of starting vehicle control is suspended, a control command generation process and a vehicle transmission process are suspended such that vehicle control commands are not executed by the at least one electronic control unit.

18. The control device according to claim 13, wherein the ECUs are connected by a peer-to-peer (P2P) architecture formed by the block chain.

* * * * *